(12) United States Patent
Sills et al.

(10) Patent No.: US 9,843,286 B2
(45) Date of Patent: Dec. 12, 2017

(54) SMART SOLAR TILE NETWORKS

(71) Applicant: Google Inc., Mountain View, CA (US)

(72) Inventors: Max Andrew Sills, San Francisco, CA (US); Daniel J. Berlin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 14/807,718

(22) Filed: Jul. 23, 2015

(65) Prior Publication Data

US 2017/0025983 A1    Jan. 26, 2017

(51) Int. Cl.
| | | |
|---|---|---|
| H02N 6/00 | (2006.01) | |
| H01L 31/042 | (2014.01) | |
| H02S 10/00 | (2014.01) | |
| G05B 15/02 | (2006.01) | |
| H02S 50/00 | (2014.01) | |

(52) U.S. Cl.
CPC ............ *H02S 10/00* (2013.01); *G05B 15/02* (2013.01); *H02S 50/00* (2013.01)

(58) Field of Classification Search
None
See application file for complete search history.

(56) References Cited

U.S. PATENT DOCUMENTS 3,696,286 A * 10/1972 Ule ..................... B64G 1/425
136/291
8,563,845 B2 * 10/2013 Work .................... H02J 7/35
136/244
2009/0014057 A1 * 1/2009 Croft ................... H02S 20/23
136/248
2015/0308889 A1    10/2015 Stueve et al.

FOREIGN PATENT DOCUMENTS

| CN | 203084944 U | 7/2013 |
|---|---|---|
| CN | 203097368 U | 7/2013 |
| WO | WO 2013/158847 | 10/2013 |

(Continued)

OTHER PUBLICATIONS

International Search Report and Written Opinion in International Application No. PCT/US2016/042771, dated Oct. 28, 2016, 10 pages.

(Continued)

*Primary Examiner* — Tamir Ayad
(74) *Attorney, Agent, or Firm* — Fish & Richardson P.C.

(57) ABSTRACT

Methods, systems, and apparatus, including computer programs encoded on a computer storage medium, for a dynamic solar tile network. In one aspect, a method includes designating a first solar tile in a set of solar tiles as a control tile. Selecting a subset of solar tiles in the set of solar tiles as controlled tiles that are each controlled by the control tile to form a solar tile network that includes the control tile and the controlled tiles. Receiving, at the control tile, status information from each of the controlled tiles. Determining, by the control tile, an operational state for each of the controlled tiles based on the status information. Transmitting, by the control tile, operation instructions to the controlled tiles that cause each controlled tile to switch to the operational state determined by the control tile.

14 Claims, 5 Drawing Sheets

(56) References Cited

FOREIGN PATENT DOCUMENTS

WO    WO 2014/122705    8/2014

OTHER PUBLICATIONS

'Wireless charging for electric vehicles hits the road,' [online][Retrieved on Jul. 23, 2015]; Retrieved from the Internet URL: http://www.newscientist.com/article/mg22129534.900-wireless-charging-for-electric-vehicles-hits-the-road.html; Jan. 22, 2014.
Raghunathan, et al. "Design Considerations for Solar Energy Harvesting Wireless Embedded Systems," Center for Embedded Network Sensing, University of California, May 5, 2005.
Shinohara, et al. "Recent Wireless Power Transmission Technologies in Japan for Space Solar Power Station/Satellite," IEEE 2009.
"Solar Roadways," [online][Retrieved on Jul. 23, 2015]; Retrieved from the Internet URL: https://www.indiegogo.com/projects/solar-roadways; pp. 20-23 and 27-31.

* cited by examiner

SMART SOLAR TILE NETWORKS

BACKGROUND

Recent advances in photovoltaic technology and the desire to utilize clean energy has created a proliferation of new and improved photovoltaic devices. Advances in manufacturing and fabrication of photovoltaic (solar) cells have enabled more efficient solar cells and thus larger groups of coupled solar cells to act as one large body or network of solar cells. Examples include the increased deployment of solar power generating stations, including the traditional solar farms as well as the more recent solar photovoltaic power plants. These advances in solar technology also create alternative uses for solar tile networks.

SUMMARY

This specification describes technologies relating to solar tile networks and solar panel network control systems.

In general, one innovative aspect of the subject matter described in this specification can be embodied in methods that include the actions of designating a first solar tile in a set of solar tiles as a control tile. Each tile in the set of solar tiles is operative to be selectively placed in one of a plurality of operational states. Each operational state has a corresponding tile function that the tile performs while in that operational state. Selecting a subset of solar tiles in the set of solar tiles as controlled tiles that are each controlled by the control tile to form a solar tile network that includes the control tile and the controlled tiles. Receiving, at the control tile, status information from each of the controlled tiles. Determining, by the control tile, an operational state for each of the controlled tiles based on the status information. Transmitting, by the control tile, operation instructions to the controlled tiles that cause each controlled tile to switch to the operational state determined by the control tile. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. In some implementations, solar tiles in a solar tile network can be part of a dynamic control system that monitors operational states of each solar tile within the solar tile network. The solar tile network control system can enable a solar tile network to dynamically alter operating states according information about a solar tile's current state. In some implementations, the solar tile network can transmit information between solar tiles and objects with a close proximity of a solar tile within the solar tile network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The systems and methods described below facilitate a dynamic control system for a solar tile network which typically includes at least two solar tiles. The control system can designate a control solar tile that provides operation instructions to other controlled solar tiles based on status information received from the controlled solar tiles within the network. Further, the control solar tile can dictate which operational state the other controlled solar tiles occupy and operate in. In some implementations, operational states a controlled solar tile occupies is determined by measuring various environmental state thresholds and environmental state time thresholds.

In some implementations, a controlled solar tile can occupy a power generation operational state similar to the role of a traditional solar tile, which is to create power for the solar tile network, for a micro-grid, etc. In some implementations, a controlled solar tile can occupy other operational states such as charging, display, communication, etc., according to a determination made by the control solar tile. The solar tiles can communicate with other solar tiles within the network and also to devices external to the solar tile network that are configured to send and receive information with the solar tile network.

These features and additional features are described in more detail below.

Figure 1:
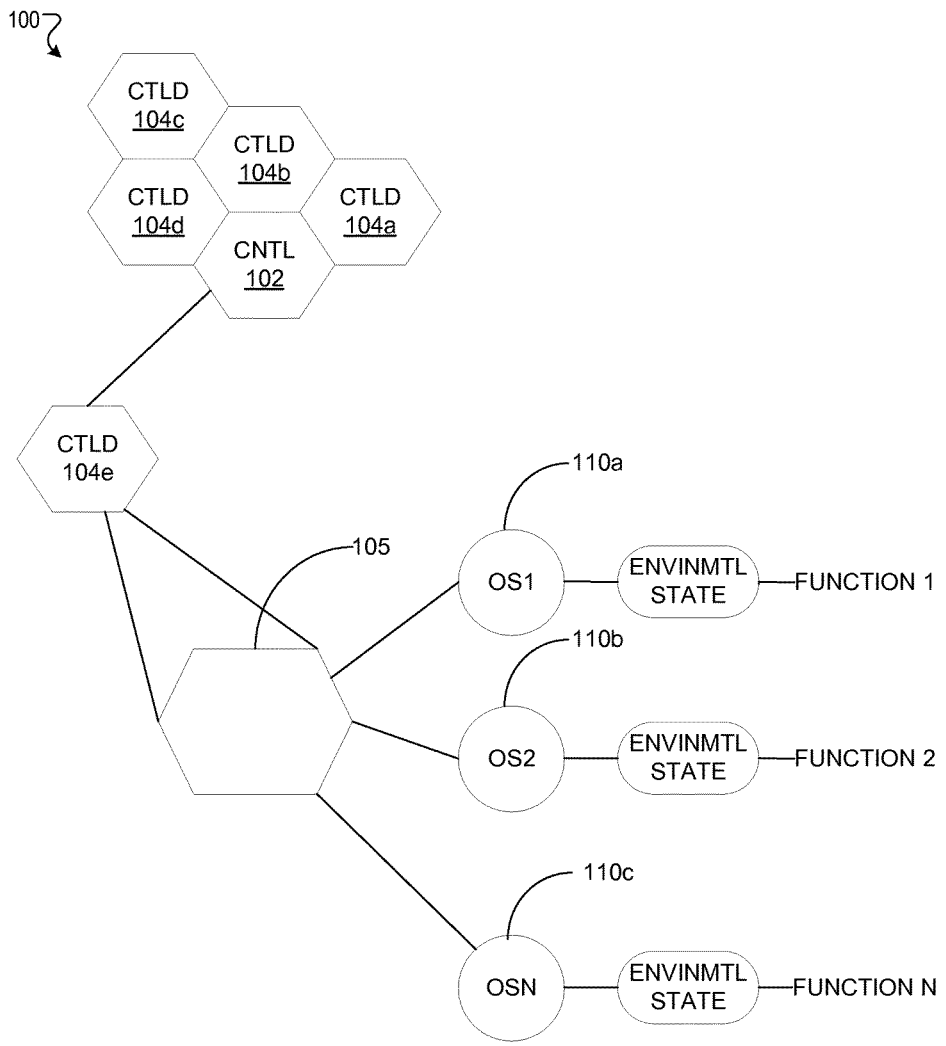
FIG. 1 is a block diagram illustrating an example solar tile network.

FIG. 1 is a block diagram illustrating an example solar tile network 100. In some implementations, a solar tile network includes at least two solar tiles coupled together. Typically, a solar tile 105 is a characteristic photovoltaic panel/cell created using semi-conductor material (e.g., silicon, gallium arsenide, gallium selenide, cadmium telluride, etc.). Further, the semi-conductor is covered with glass, acrylic, fluorocarbon, etc. to create the photovoltaic cell.

In some implementations, the solar tiles 105 can be ruggedized solar panels. A ruggedized solar panel can be a solar panel designed to withstand higher amounts of direct pressure placed on the panel, higher and/or cooler ambient temperatures, harsh environmental conditions, and other outdoor environment demands. For example, the tiles may for the surface of a road or parking lot.

A solar tile 105 can create direct current (DC) electricity. Current is generated from the movement of electrons and holes that are excited by the presence of light on the surface of the solar tile. In some implementations, a solar tile 105 can include a piezoelectric solar tile 105, which can create a potential proportional to an amount of pressure applied to the solar tile 105. Generally, the pressure on the solar tile is created by an external force. The electricity generated by the solar tile 105 can be added to the electricity generated by other solar tiles. The electricity can be used to charge an energy storage device (e.g., fuel cell, battery, etc.) or can be inverted and added to a grid, a micro-grid, an electrical load, or any other device of the like.

The solar tiles 105 can be connected together via a hook and clasp mechanism. The hook and clasp mechanism enables the solar tiles to fit together in a large corpus. The solar tiles can also be connected via other mechanisms such as high strength epoxy, a clear ruggedized layer over all of the solar tiles 105, or any other connecting means of the like.

The solar tile network 100 includes a control solar tile 102 (e.g., control tile) and at least one controlled solar tile 104a-e. In some implementations, a solar tile network 100 can also include a collection of solar tile sub-networks where each sub-network is controlled by a respective control solar tile 102. For each sub-network, the solar network 100 can choose the control solar tile 102 according to predefined factors. In some implementations, the predefined factors can include a solar tile 105 with the strongest communication signal with external communication networks, the solar tile with the strongest communication signal to the other solar tiles or sub-networks within the solar tile network 100, a solar tile that has been predetermined to be a control tile, or any other characterization of the like.

In some implementations, a solar tile network 100 can include a mesh network, an ad hoc network, a wide area network (WANET), a star network, a node network, a fully connected network, or any other mechanism for communicatively and functionally connecting at least two solar tiles.

A solar tile 105 can function in an operational state that determines an operational function of the solar tile 105. A controlled solar tile 104a-e can dynamically change operational states as directed by the control solar tile 102. In addition, each controlled solar tile 104a-e can represent 1-n operational states as designed by the solar network system 100.

Example operational states include a display operational state, a controlled operational state, a charging operational state, a power generation occupational state, and a control operational state. Additionally, each operational state (OS) can represent a different corresponding solar tile function. For example, OS1 110a can represent the power generation operational state. The power generation operational state can collect sunlight to generate power for a micro-grid, battery bank, or some other energy utilization device.

In some implementations, a solar tile 105 can communicate externally to other devices. A solar tile can also communicate with other solar tiles. In addition, solar tiles 105 can communicate with solar tiles that are in a different sub-network or within the solar tile network system 100. The solar tiles 105 can utilize various communication protocols such as 802.11 a, b, g, n, Bluetooth, near field communication (NFC), Ethernet, 3G, 4g, LTE, XLTE, etc.

Typically, a solar tile 105 includes a processor with executable instructions to dynamically control and change the operational state of the solar tile 105. Each solar tile 105 can perform functions corresponding to each operational state according to the operational state that is determined for each solar tile. For example, a solar tile operating in the power generation operational state can generate electricity from direct sunlight and provide the resultant energy to an external device for charging.

In some implementations, a group of adjacent solar tiles within a network can operate together to create a large area of solar tiles operating in the same operational state. For example, a group of solar tiles operating in the display operational state can create one image by each solar tile within the group displaying their own section of the one image. Putting all of the individual solar tiles that are displaying a piece of the image together creates a display of the entire image.

Typically, a solar tile 105 that is a control solar tile 102 is in a control operational state. In some implementations, the control solar tile 102 determines the state of the controlled solar tiles 104a-e within the solar tile network 100. For example, the control solar tile 105 can send operation instructions to one or more controlled solar tiles 104a-e that dictates which operational state for the controlled solar tiles to embody.

In some implementations, the control solar tile 102 dictates the operational state of the controlled solar tiles according to status information associated with each of the controlled solar tiles. The control solar tile 102 can receive status information from the controlled tiles 104a-e via the communication protocol of the solar tiles. For example, solar tiles can send status information through a wireless communication protocol.

In some implementations, status information can include a present operational state that a particular solar tile 105 is occupying. Status information can also include the current state of the environment external to the solar tile (e.g., in shade, direct sunlight, rainy, position of the solar tile relative to other objects, whether or not an object is above the solar tile, etc.).

In some implementations, the control solar tile 102 receives status information from the controlled solar tiles 104a-e at a predefined time interval (e.g., once every 1 second, 30 seconds, 1 minute, etc.). For example, once communication with the controlled solar tiles 104a-e is initiated, the controlled solar tiles autonomously transmit status information to the control solar tile 102 at the predefined time interval. In addition, the control solar tile 102 can also query one or more specific controlled solar tiles for status information. The control solar tile 102 can also query status information according to a predetermined time interval and/or as directed by a user or other outside entity.

In a scenario where the control solar tile 102 does not consistently receive status updates and/or the control solar tile ceases to receive status updates from one or more controlled solar tiles 104a-e, the control solar tile can send a "ping" to the one or more controlled solar tiles. In some implementations, the "ping" is a communication signal sent to the unresponsive controlled tile to verify communication operability.

The "ping" can ensure that the control solar tile can still communicate with the one or more controlled solar tiles. In addition, the "ping" can also inquire a status check with the one or more controlled solar tiles. For example, the status check can cause the one or more controlled solar tiles to enter into a diagnostic check operational state. The diagnostic check operational state can run a systems check that ensures all components of the one or more non-responsive controlled solar tiles are still functioning according to normal operations.

The control solar tile may be selected based on a variety of factors, such as environmental factors. For example, a network of solar tiles in a parking lot may periodically evaluate their respective environmental conditions, e.g., each tile in a subnetwork may determine if it is in the shade or sun. A tile in the shade may be selected as a control tile, as it will not be able to produce enough energy for charging an external device. Later in the day, when the control tile is in the sun, it may switch its role to a charging tile, and select another charging tile that is now in the shade as a control tile. More particularly, as status information regarding the environment external to a controlled solar tile modifies (e.g., day to night, sunny to cloudy, etc.), the control solar tile 102 can change the operational state of the controlled solar tiles 104*a-e* experiencing the change in the external environment. For example, as a controlled solar tile's external environment changes from day to night, a controlled solar tile may dictate that the controlled solar tile change its operational status from a power generation operational state to a display operational state.

Typically, an environmental state is determined from a predefined environmental state threshold and/or a predetermined environmental state time threshold. In some implementations, the predefined environmental state threshold defines a minimum level for a condition that must be met before an environmental state is acknowledged. For example, a minimum illumination level may be required before a tile is determined to be a "sunlit" environment state. Likewise, a predefined environmental state time threshold defines an amount of time that the condition must be met before and environmental state is acknowledged. For example, when a tile in the shade from a car is exposed to sunlight after a car leaves a parking spot, the tile will not automatically be switched to a display state as another car may soon take the place of the recently departed car. After a threshold amount of time, e.g. thirty seconds, however, the tiles may change to a display state to display a handicap parking symbol to indicate the parking space is reserved.

In some implementations, the control solar tile 102 acknowledges an environmental state by analyzing status information received from the controlled solar tiles 104*a-e*. The control solar tile can dynamically change the operational state of the controlled solar tiles 102*a-e* based on the acknowledgement of an environmental state.

In some implementations, the controlled solar tile 104*a-e* acknowledges an environmental state based on environmental data collected at the controlled solar tile. Subsequently, the controlled solar tile can include acknowledgement of an environmental state in a status update sent to the control solar tile 102.

For example, a sunny environmental state may define whether the sun is directly or indirectly shining on a controlled solar tile 104*a-e*. The environmental state threshold may be defined such that the sun shining on the controlled solar tile 104*a-e* exceed a predefined percentage (e.g., 40%, 60%, 90%, etc.) of the surface area of the controlled solar tile prior to the control solar tile acknowledging the environmental state for that particular controlled solar tile. Likewise, the environmental state time threshold may be defined such that the sun shining on the controlled solar tile 104*a-e* exceeds a predefined amount of time (30 seconds, 1 minute, 5 minutes, etc.) prior to the control solar tile's acknowledgement of an environmental state for the particular controlled solar tile.

In some implementations, the sunny environmental state threshold may also be defined by the angle the sun is shining on the controlled solar tile 104*a-e* or any other attribute to suitably define how much direct or indirect sun light a solar tile receives. Further, a correlating operational state for a sunny environmental state can be the power generation operational state OS1 110*a*.

In some implementations, when a control solar tile 102 acknowledges the environmental state for a controlled solar tile 104*a-e*, the control solar tile 102 sends operation instructions to change the operational state of the controlled solar tile 104*a-e* according to the particular acknowledged environmental state. If the controlled solar tile 104*a-e* is already in the corresponding operational state, then the control solar tile will not send operation instructions to the controlled solar tile in said operational state. Further, an environmental state may have any number or combinations of thresholds (1, 2, 3, etc.) to be met before the control solar tile 102 acknowledges the environmental state.

For example, if the controlled solar tile 104*a-e* is receiving enough sun light for a long enough period of time, as determined by meeting and exceeding the sunny environmental state threshold and/or the sunny environmental state time threshold, the control solar tile 102 acknowledges that the controlled solar tile 104*a-e* is in a sunny environmental state. Upon acknowledging a sunny environmental state, the control tile can dictate the controlled solar tile change to the power generation operational state.

In some implementations, the control solar tile 102 uses a table, database or other data structure stored in a memory location (local memory or an external memory in the cloud, etc.) to match corresponding environmental states to equivalent operational states. As the control solar tile 102 acknowledges that a single or group of controlled solar tiles 104*a-e* is in a confirmed environmental state, the control solar tile identifies the corresponding operational state via the table, and sends an instructional command to the controlled solar tiles 104*a-e* to change from the controlled tile's current operational state to the operational state that corresponds to the acknowledged environmental state.

In another example, operational state two OS2 110*b* can represent the charging operational state. In some implementations, when a controlled solar tile 104*a-e* is in the charging operational state OS2 110*b*, the controlled solar tile can emit a magnetic field such that an electric vehicle equipped with a large induction coil and a battery can receive the magnetic lines of flux to charge the electric vehicle's battery.

Similar to the power generation operational state OS1 110*a* and the sunny environmental state, the charging operational state OS2 110*b* has a corresponding mutual inductance environmental state, environmental state threshold, and environmental state time threshold. In some implementations, the controlled solar tile 104*a-e* can sense a mutual inductance between the controlled solar tile and the electric vehicle. The mutual inductance threshold can be defined as a measured level of inductance (e.g., Henries) between the electric vehicle and the controlled solar tile that is to be met and/or exceeded. Additionally, the mutual inductance time threshold can define an amount of time that a certain level of mutual inductance between the electric car and the controlled solar tile 104*a-e* has to be maintained before the control solar tile acknowledges the mutual inductance environmental state.

As previously described and in some implementations, both the mutual inductance threshold and the mutual inductance time threshold can be met before the control solar tile 102 acknowledges the mutual inductance environmental state. In other implementations, the mutual induction threshold or the mutual inductance time threshold can be met before the control solar tile acknowledges the mutual inductance environmental state.

A controlled solar tile 104*a-e* can occupy a display operational state. The display operational state can include a controlled solar tile 104*a-e* displaying an image on the surface of the controlled solar tile 104*a-e*. In some implementations, more than one controlled solar tile 104*a-e* can include a corpus such that together they display one image (e.g., text, image, sign, etc.). For example, the control solar tile 102 can access a memory component to attain image display data and instructional directions for the controlled solar tiles to display one image. Further, the displayed image can alternate between multiple images on a timed frequency.

In some implementations, the image display data can include software executable instructions or code that dictate which portions of a controlled solar tile 104a-e to illuminate to create the whole or portion of the display image.

The controlled solar tiles 104a-e can use various display mechanisms to display an image. In some implementations, the controlled solar tiles 104a-e uses an array of LEDs, electrophoretic elements, etc., to display an image. The control solar tile 102 can decide between display mechanisms for controlled solar tiles 104 a-e according to environmental conditions relayed to the control solar tile 102 via status information updates.

In some implementations, the control tile sends an operational instruction to the controlled solar tiles 104a-e that includes an instruction to change to the display operational state. The control tile 102 can transmit image data along with the operational instruction to the controlled solar tiles that defines an illuminated pattern to be displayed on the surface of the controlled solar tiles. In some implementations, the image data can be used to create an image on the surface of the controlled solar tiles 104. For example, the image data can be used to create road signs, advertisements, or any other image of the like.

Figure 2:
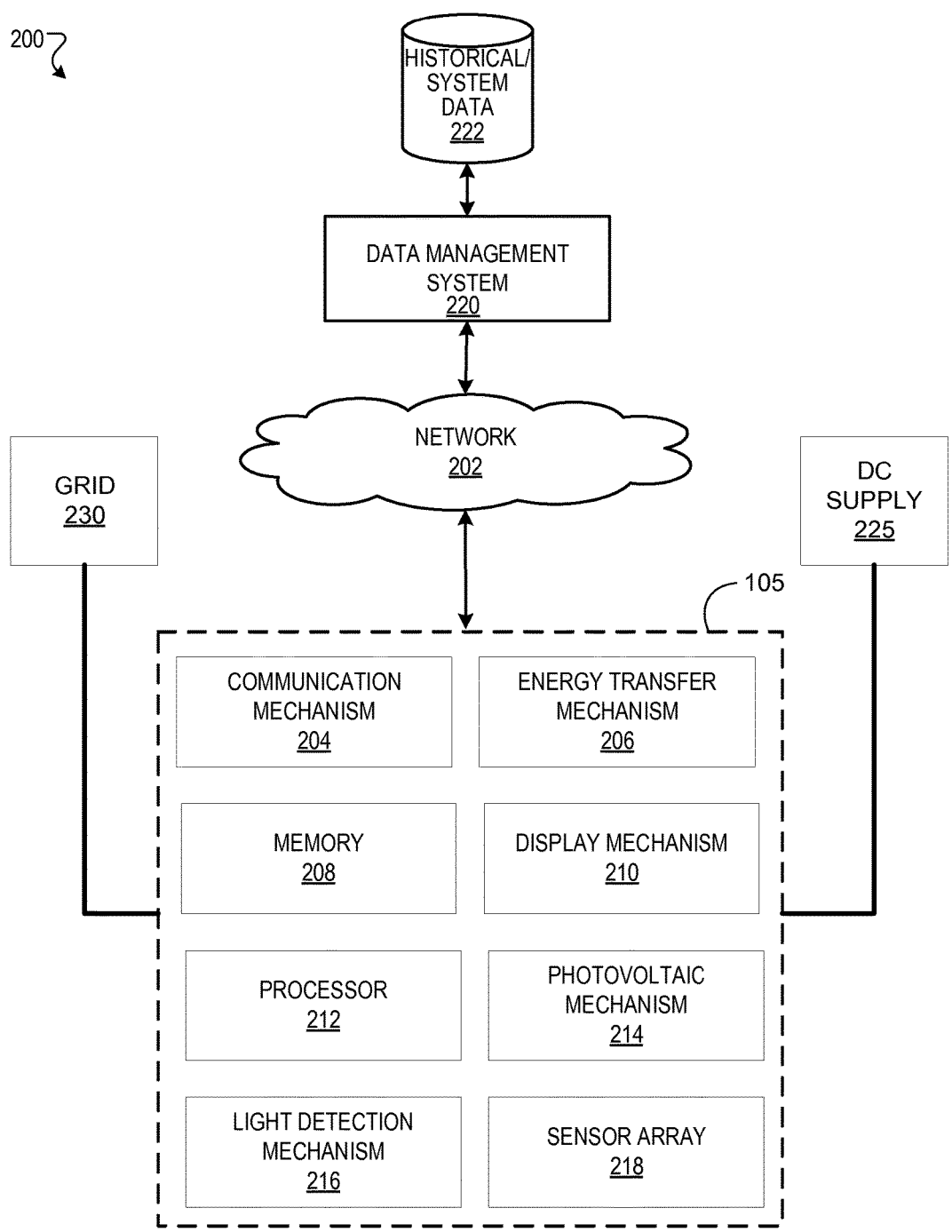
FIG. 2 is a block diagram showing an example solar tile network system architecture.

FIG. 2 is a block diagram showing an example solar tile network system architecture 200. The solar tile network system architecture 200 enables functionality of the control solar tile 102 and the controlled solar tiles 104a-e within a network. The solar tile network system architecture includes a data storage system that stores historical and/or system data. The historical/system data 222 stores various system information related to operational states, display information, campaign information, and system information.

Operational state information can include software executable code for operating a solar tile 105 in a particular operational state. In some implementations, a controlled solar tile 104a-e can download the necessary control data to execute and operate in a particular operational state when the control solar tile 102 directs the controlled solar tile 1045a-e to switch states.

Display information can include data corresponding to various display templates (e.g., coordinates for adjacent controlled solar tiles 104a-e such that the group of controlled solar tiles can display one image). For example, campaign information can include data for various advertisement and marketing campaigns such as the name of perspective advertisers, corresponding advertising campaign data, and associated campaign display data.

In some implementations, system information can also include data relating to system status information, network status information, etc. For example, system information can include a list of controlled tiles that are communicatively unresponsive.

The solar tile network system architecture 200 includes a DC supply 225. In some implementations, the DC supply 225 can provide power to the solar tiles 105 within the solar tile network. Accordingly, the solar tiles 105 can execute functions associated with operational states utilizing the power consumed from the DC supply. For example, the LED display can use the DC power to illuminate the LEDs.

In some implementations, the power generated by the solar tiles can be used to charge the DC supply. The DC supply can include a battery bank or some other energy storage mechanism of the like. Each solar tile can also have its own respective energy storage device.

The solar tile network system architecture 200 optionally includes an AC supply 230. In some implementations, the AC supply 230 can provide power to the solar tiles 105 within the solar tile network. Similarly, the solar tiles can execute functions associated with the various functions utilizing the power consumed by the AC supply.

In some implementations, the power generated by the solar tiles can pass through in an inverter (not shown) and added to the AC supply 230. In some implementations, the AC supply 230 can include an electrical grid, e.g., a resistive grid, a microgrid, a residential power distribution system, or an industrial power distribution system.

The solar tiles can be in data communication with a data management system 220 that serves as an interface between a network 202 and the data storage system (e.g., historical/system data 222). In some implementations, the data management system 220 serves as an interface to manipulate data within the historical/system data 222. For example, the data management system 220 can direct data access requests to a particular data destination.

The network 202 is the communication protocol for solar tiles to communicate with other solar tiles, entities external to the solar tile network, and with the components within the solar tile network. In some implementations, the network 202 can include 802.11 a, b, g, n, Bluetooth, near field communication (NFC), Ethernet, 3G, 4g, LTE, XLTE, etc.

A solar tile 105 can include multiple modules for operating in an operational state, collecting information to send in status updates, receiving information and instructional commands, process and store data used for operation, and other functions that enable the solar tile 105 to function in operational states. As previously mentioned, although solar tiles 105 can be manufactured to operate in one or two operational states, typically, solar tiles 105 are manufactured such that each solar tile can operate in each operational state.

As previously described, in some implementations, the solar tile 105 can communicate with other entities (e.g., the solar tile network system 200, other solar tiles, and entities external to the solar tile network), via the communication mechanism 204. The communication mechanism can be configured to communicate via 802.11 a, b, g, n, Bluetooth, near field communication (NFC), Ethernet, 3G, 4g, LTE, XLTE, etc. In some implementations, the communication mechanism 204 can communicate using more than one communication protocol. The communication mechanism 204 can be configured to send and receive data, information, including status information and operation instructions.

A solar tile 105 can include a processor 212 for processing computer executable instructions to operate the solar tile 102 in its various operational states (as previously described). The processor is in communication with the communication mechanism 204, the energy transfer mechanism 206, the memory 208, the display mechanism 210, the photovoltaic mechanism 214, the light detection mechanism 216, and the sensor array 218. The processor 212 can send and receive data from the other components within the solar tile 105.

In some implementations, the processor 212 of the control solar tile 102 can determine an operational state for a controlled solar tile 104a-e based on status information received from the controlled solar tiles 104a-e. The processor 212 interprets the data received in the status update and determines the environmental state of the controlled solar tile and whether the controlled solar tile should stay in its present operational state or change operational states according to the determined operational state. Accordingly, the processor 212 of a controlled solar tile 104a-e can determine what information and data to send in a status information update based on the information collected by the controlled solar tile 104a-e.

Memory 208 is used to store various system and solar tile 105 information. In some implementations, the memory 208 can store data for the operating system, data corresponding to each operational state and the executable instructions for each operational state, display data, data and instructions for operating as the control solar tile 102, etc. The memory 208 can include semiconductor memory devices, e.g., EPROM, EEPROM, and flash memory devices.

In some implementations, the solar tile 105 includes an energy transfer mechanism for wirelessly charging objects (e.g., electric vehicles, etc.). The energy transfer mechanism can include a large inductive coil within the solar tile, an oscillator circuit, a frequency modulator, rectifier circuit, and/or voltage regulator. The energy transfer mechanism can receive an alternating current or a direct current. In some implementations, the solar tiles use electromagnetic coupling, where the frequency of the transmitting coils and the receiving coils match induced resonance effects.

In some implementations, the large inductive coil can be arranged within the solar tile in a configuration suitable to transfer power to an external entity. For example, the large inductive coil can be wrapped around the outer edges of the solar tile 105. In another example, the bottom of the solar tile 105 can include the inductive coil wound around and covering the surface of the bottom face of the solar tile 105.

In other implementations, the energy transfer mechanism 206 receives a DC signal from a DC supply 225 and converts the DC signal into an AC signal using the oscillator. The AC signal is passed through the induction coil within the solar panel creating alternating lines of flux for the induction coil within the external object and charge the external object's battery. In some implementations, the energy transfer mechanism receives an AC signal from the grid to create and emit magnetic lines of flux in a similar manner to charge an external object.

For example, an electric car that is parked above one or more controlled solar tiles 104a-e can have a large induction coil near the underside of the vehicle. The induction coil can couple the magnetic lines of flux emitted from the control solar tiles 104a-e. The received magnetic lines of flux create a flow of current within the induction coil, pass through a rectifier to transform the current to direct current, and charge the battery for the electric vehicle. In some implementations, the processor 212 determines which energy transfer mechanism a solar tile utilizes based on predetermined factors (e.g., power availability, power source availability, power signal strength, etc.).

The display mechanism 210 displays an image or portions of an image on the surface of a solar tile 105. As previously described, a portion of a whole image can be displayed on each of a group of adjacent solar tiles such that collectively, the solar tiles display an entire image. In some implementations, an image can be a sign, a message, text, numbers, an advertisement campaign, or any other entity that can be suitably displayed on a solar tile 105. Accordingly, various predefined parameters (i.e., location of an array of controlled solar tiles 104a-e, predetermined operation of the array of controlled solar tiles, collected status information for the array of controlled solar tiles, etc.) define when one or more controlled solar tiles are in a display operational state and what image is displayed on the controlled solar tiles.

In some implementations, the display mechanism 210 includes a light emitting diode (LED) display. The LED display can illuminate in one color or many colors according to the intended design of the solar tile 105. The LED display can be arranged in any arrangement within the solar tile. In some implementations, the processor 212 dictates to the LED display the lighting pattern or which LEDs to illuminate and which to leave off.

In some implementations, the display mechanism 210 includes an electrophoretic display. The electrophoretic display can be used for images displayed during the day. The electrophoretic display includes a liquid polymer layer with e-ink capsules inside of it and transparent electrode layers on either side of it. Different color e-ink capsules have different electric charges. By varying the charge underneath and on top of the liquid polymer layer, e-ink capsules containing opposite charges are either attracted to the top or the bottom of the liquid polymer layer. The top electrode layer configures the charges such that a pattern of e-ink capsules that arise to top are in an arrangement that creates an image.

Similar to the LED display, the processor 212 dictates the order of the charges for the electrode layers according to determined display patterns. In some implementations, display patterns may be stored in the memory 208 within the control solar tile 102. In other implementations, the control solar tile 102 accesses and downloads the display patterns from the historical/system data 222 and transmits the corresponding instructions to the controlled solar tiles 104a-e. In some implementations, the control solar tile 102 transmits the image data to each of the intended controlled solar tiles 104a-e such that the individual solar tiles have the image data to create their individual part of a whole image.

In other implementations, the control solar tile 102 directs each individually controlled solar tile 104a-e designated to display an image to download image data specific to each individual cell from the historical/system data 222. Accordingly, the control solar tile can transmit instructions to the controlled solar tile(s) 104a-e that include memory locations and/or addresses of the designated image data within the historical/system data 222.

In some implementations, based on status information received, the control tile 102 can change different operational features within the operational state of the controlled solar tiles 104a-e. A control tile 102 can send operation instructions to a controlled tile 104a-e in the operational state to alter the displayed image. A display image can be altered according to data contained in the status update, the time of day, maximization of the solar tile network operations, or any other characteristic where it would be suitable to alter the displayed image. For example, if the external environment changes from day to night, the display image on one or more controlled solar tiles 104a-e may change from a marketing campaign to a street sign.

Further, the location of a display image can be modified according to data received in status information, the time of day, the maximization of solar tile network operations, or any other characterization suitable to modify the location of the display image. As will be described in greater detail in connection with FIG. 3, lines defining spaces of a parking lot can be moved to different locations within the parking lot to maximize the use of the space within the parking lot.

In some implementations, relative maximization of the solar tile network power generation can include changing the operational state of each of the network of solar tiles such that the majority of the controlled solar tiles within the network are operating in an operational state that makes the best use of the majority of the controlled solar tiles within the network. Additional details of solar tile network relative maximization are described in connection with FIG. 3.

The photovoltaic mechanism 214 includes a photovoltaic substrate that exhibits the photovoltaic effect. Typically, the photovoltaic mechanism includes a semi-conductor material (e.g., silicon, gallium arsenide, gallium selenide, cadmium telluride, etc.). The photovoltaic mechanism 214 uses light emitted from the sun to generate electrical power. In some implementations, the processor 212 can determine whether the generated power goes to charge a DC supply 225 or goes directly to an AC supply 230.

The communication mechanism 204 includes a communication card that enables the solar tile 105 to communicate with other solar tiles and with entities and objects outside of the solar network (e.g., billboard, vehicle, computing device, mobile device, etc.). The communication mechanism's communication protocols can include 802.11 a, b, g, n, Bluetooth, near field communication (NFC), Ethernet, 3G, 4g, LTE, XLTE, or any other communication protocol of the like. In some implementations, solar tiles can communicate to adjacent solar tiles, solar tiles in another sub-network, and/or any other solar tile within the solar tile network 100. The solar tiles 105 within the solar tile network 100 can transmit instructional data, system data, status information, messages, etc. The processor 212 can determine the communications protocol to use according to the intended destination of the communicated data.

In some implementations, the solar tile 105 can communicate and transfer data through the cloud. Further, external entities can communication (i.e., send/receive data) through cloud storage repositories (not shown) and cloud communication protocols.

The light detection mechanism 216 determines if light is illuminating the solar tile 105 and how much light is illuminating the solar tile. The light detection mechanism 216 can transmit a data signal (i.e., digital signal, analog signal, etc.) to the processor 212 indicating the amount of light currently accessible to the solar tile 105. In some implementations, the solar tile network system, by use of an external data management system 220 in data communication with the solar tile network system can keep a historical record of the days and times the sun shines on a solar tile 105 to create various predictive modeling capabilities (e.g., predetermining when a solar tile 105 occupies an operational state based on historical data) and a historical log for record keeping. This data can then be used for network selection and determining operational states of the solar tiles in the network. For example, during a weekend when relatively few cars are parked in a lot, the solar tiles may primarily be configured to be a display network to display messages, advertisements, etc. During the weekdays, however, the default configuration may be a parking lot configuration.

In some implementations, the light detection mechanism 216 includes a photodetector such as photo resistors, electro-optical sensor, photoelectric sensor, position sensor, or any other sensor of the like. Generally, the light detection mechanism 216 converts light into a resistance or electrical signal that can be detected and interpreted by the processor 212 as a quantifiable measure of the presence of light. In some implementations, the processor 212 interprets the data provided by the light detection mechanism 216 to determine the measure of the presence of light.

For example, the solar tile 105 uses the light detection mechanism 216 to determine the sunny environmental state previously described. In addition, data collected by the light detection mechanism 216 is used to determine whether the sunny environmental state threshold and the sunny environmental state time threshold has been met. In some implementations, the processor 212 includes a counter (not shown) that tracks the time data is received and recorded. The counter helps determine whether the environmental state time threshold has been met.

The sensor array 218 detects other environmental conditions exterior to the solar tile 105. In some implementations, the sensor array 218 includes the light detection mechanism 216. The sensor array 218 transmits data to the processor 212 such that the processor interprets the data to determine different environmental states.

In some implementations, the sensor array 218 detects the presence of a magnetic field and mutual inductance within close proximity (e.g., 5 cm, 10 cm, 50 cm, 1 m, etc.) of the solar tile 105. Accordingly, if the magnetic field and mutual inductance detected by the sensor array 218 meets an environmental state threshold and/or an environmental state time threshold, the data collected by the sensor array helps to determine a corresponding environmental state.

The sensor array 218 can collect information and determine the direction and distance of the magnetic field. In some implementations, the processor 212 of the control solar tile 102 can use sensor array data received from multiple controlled solar tiles 104*a-e* to triangulate the exact location of the magnetic field mutual inductance source. Further, the control solar tile 102 can use the information received from various sensor arrays to determine which solar tiles to direct into a charging operational state to provide the highest external entity charging capability.

In some implementations, the sensor array 218 can detect the position of the solar tile 105 relative to other objects. The sensor array 218 can determine the distance from solar tile to the closest object external to the solar tile 105. In some implementations, the sensor array 218 can determine the distance to more than object within the vicinity of the solar tile 105.

Figure 3:
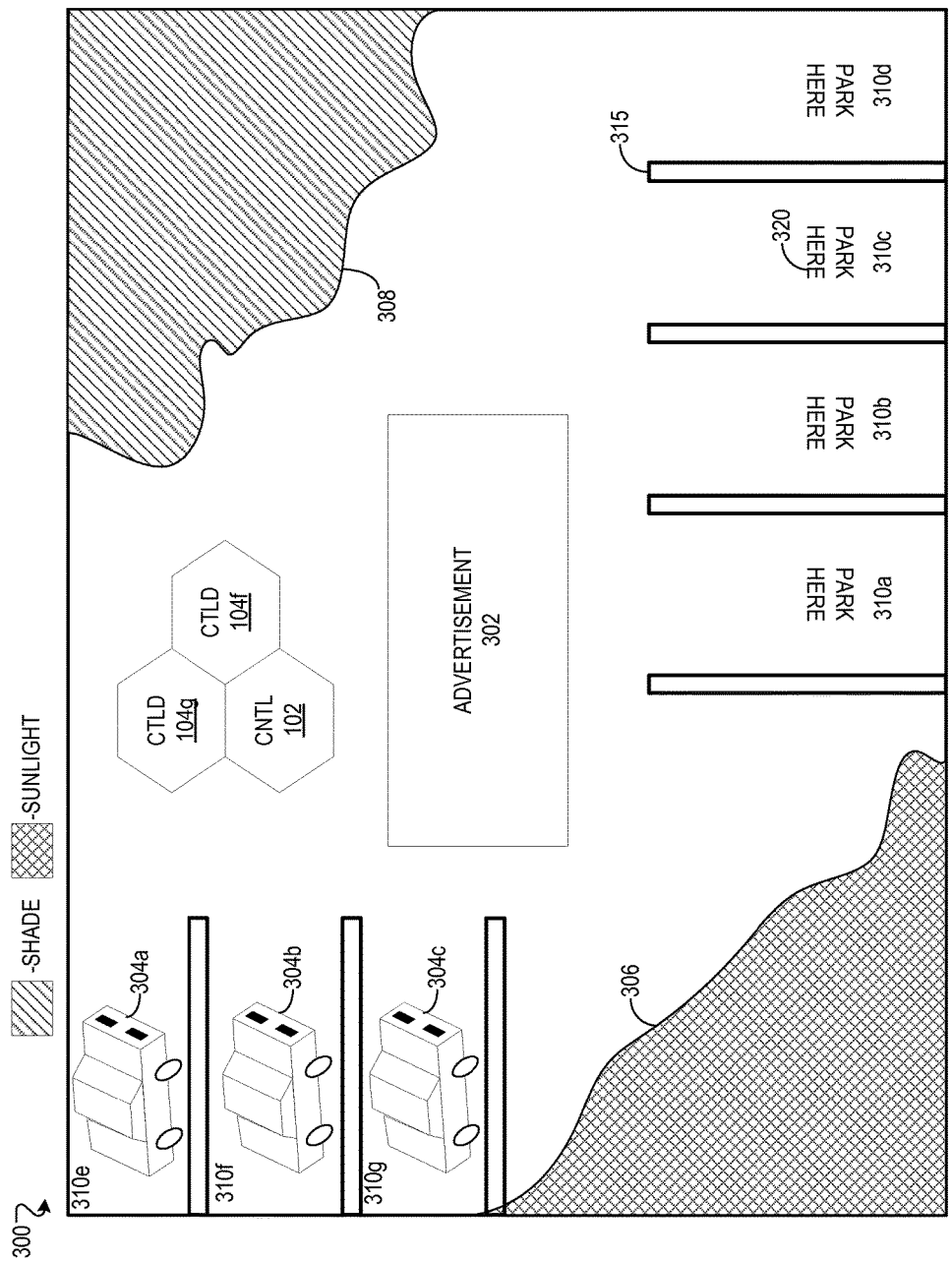
FIG. 3 is a block diagram illustrating an example solar tile network configured as a parking lot with solar tiles in various solar tile operational states.

FIG. 3 is a block diagram illustrating an example solar tile network configured as a parking lot 300 with solar tiles in various solar tile operational states. As previously described, a solar tile 105 within a solar tile network can operate in different operational states, e.g., according to the environmental state of each solar tile 105.

In the example illustrated in FIG. 3, the surface of the parking lot 300 is constructed with solar tiles 105. As previously described, a solar tile network (e.g., the parking lot 300) includes a control solar tile 102 and a plurality of controlled solar tiles 104*g-f*. The control solar tile 102 receives status updates and environmental state information to determine and dictate the operational state of the controlled solar tiles 104*f-g*. FIG. 3 illustrates a solar tile network (e.g., a parking lot 300) with controlled solar tiles 104*g-f* in multiple different operational states as each controlled solar tile operates as a part of the whole solar tile network.

As shown in FIG. 3, vehicles 304*a-c* are parked in independent occupied parking spaces 312*e-g*. In some implementations, the vehicles 304*a-c* are electric vehicles. Accordingly, the sensor array 218 within each of the controlled solar tiles beneath the vehicles 304*a-c* detect a magnetic field and mutual inductance associated with the vehicles and an induction coil within the vehicles. The processor 212 of the control solar tile 102 receives mutual inductance sensor data from the controlled solar tiles located underneath the vehicles 304*a-c*.

In some implementations, in response to acknowledging that the controlled solar tiles are in an environmental state, the control solar tile 102 determines the corresponding operational state. Further, the control solar tile 102 determines if the controlled solar tile 104*f-g* is presently in the corresponding operational state. If the controlled solar tile is in the corresponding operational state, the control solar tile 102 does nothing. If the controlled solar tile is not in the corresponding operational state, the control solar tile 102 transmits instructions to the controlled solar tile to switch its operations to the corresponding operational state.

In other implementations, the controlled solar tiles underneath the vehicles 304a-c collect mutual inductance data with the sensor array 216 within the controlled solar tiles. The processor 212 within the controlled solar tiles determines whether the mutual inductance environmental state has been acknowledged based on meeting the mutual inductance state threshold and the mutual inductance state time threshold. Subsequently, the controlled solar tile sends data indicating the acknowledgement of the mutual inductance environmental state to the control solar tile 102. In response to receiving the acknowledgement data from the controlled solar tile, the control solar tile 102 makes a determination of operational state similar to that described above.

Once the controlled solar tiles within the occupied parking spaces 312e-g are in the charging operational state, the controlled solar tile underneath the vehicles 304a-c charge the vehicles. In some implementations, controlled solar tiles around the vehicles assist in charging the vehicles.

Shown in FIG. 3, a group of controlled solar tiles 104f-g are in a sun lit portion 306 of the parking lot 300. In a similar manner, as described above in connection with the charging operational state, the control solar tile 102 determines that the controlled solar tiles are in a sun lit portion 306 of the parking lot and ensures that the controlled solar tiles are in the power generation operational state. As previously described, the power generated from the controlled solar tiles can be used to power other solar tiles within the solar tile network, to charge a DC supply 225, and/or add to an AC supply 230.

The solar tiles in the parking lot 300 form a dynamic control system altering the operational state of the controlled solar tiles as the environment state of the controlled solar tiles 104f-g changes. For example, if the vehicle 304c leaves its occupied parking space 312g and the controlled solar tiles within the occupied parking space become a part of the sun lit area 306, the control solar tile 102 can acknowledge the change in environmental state of the controlled solar tiles and send an instructional command to the controlled solar tiles to change to the power generation operational state.

In the parking lot discussion example illustrated in FIG. 3, there are controlled solar tiles that are in a shaded portion 308 of the parking lot 300. The controlled solar tiles that are in the shaded portion 308 of the parking lot are excluded from occupying the power generation operational state because of the lack of sun light shining on the surface of the solar tiles. In some implementations, according to the placement of the controlled solar tiles 104f-g and the acknowledgment that the controlled solar tiles are in a shaded environmental state, the controlled solar tiles can occupy various other operational states.

For example, the vacant parking spaces 310a-d can be included in the shaded portion 308 of the parking lot 300. The controlled tiles within the vacant parking spaces 310a-d are within a shaded portion 308 and control solar tile 102 senses their position within the parking lot 300 via, e.g., a grid map of the tiles that describe a relative location of each tile. Accordingly, the control solar tile 102 instructs the controlled solar tiles 104 to be parking spaces. The control solar tile 102 sends instructional data to the controlled tiles within the vacant parking spaces 310a-d to operate in the display operational state. The control solar tile 102 further sends display data to the controlled solar tiles within the vacant parking spaces 310a-d such that the control tiles display the parking space line 315 and the "park here" 320.

As previously described in connection with FIG. 2, the display mechanism 210 within the controlled solar tiles of the vacant parking spaces 310a-d receive their individual display instruction data such that each controlled solar tile displays their part of the whole display.

As previously described, a solar tile 105 can report their position within the solar tile network in a status update to the control solar tile 102. As shown in FIG. 3, controlled solar tiles positioned in the middle of the parking lot 103 may not be advantageous to be parking spaces, but may provide an opportunity for an advertising and/or marketing campaign 302. The control solar tile 102 can send campaign data to the controlled solar tiles in the middle of the parking lot 300 such that an advertising campaign 302 is shown. In some implementations, the control solar tile 102 or the controlled solar tiles 104f-g access campaign data from the historical/system data 222 data base.

In some implementations, campaigns are selected according to location, the parking lot users, building surroundings, etc. For example, the parking lot 300 may be located in a business district and the advertisement 302 may display campaigns for businesses within the business district. In some implementations, the advertisement 302 may rotate through various campaigns according to a predetermined time period. The advertisement 302 can display one campaign for a period of time (e.g., 5 seconds, 10 seconds, 15 seconds, etc.) then change to a different campaign for another amount of time.

In some implementations, the control solar tile 102 within the parking lot 300 can assign operational states to the controlled solar tiles 104f-g to fulfill a purpose or goal for the overall parking lot 300. For example, the objective of the owners of the parking lot 300 can be to maximize profits for the paid parking. Accordingly, the control solar tile 102 can assign operational states such that the number of available parking spaces for vehicles to park in is maximized. In another example, the owner of the parking lot 300 may desire to optimize marketing opportunities. Accordingly, the control solar tile 102 can designate more controlled solar tiles 104f-g for the advertisement 302. The entire parking lot 300 can include no parking spaces and only an advertisement 302.

In some implementations, the owners of the parking lot 300 may offer discounts for patrons with electric vehicles. The electric vehicles can be detected according to the recognized mutual inductance, the location of the controlled solar tiles measuring the mutual inductance, and the solar tile network correlating the location of the controlled solar tiles and some form of parking space identification (e.g., parking space number, parking space code, parking space letters, etc.).

In other implementations, the control tile 102 of the parking lot 300 (i.e., the solar tile network) can determine and assign operational states to the controlled solar tiles 104f-g according to changing weather, seasons, and/or know patron patterns. Accordingly, the control tile 102 can maximize the operation of the solar tile network 100. The known patron patterns can be stored in the historical/system data 222. In some implementations, the control solar tile 102 may assign parking spaces based on shade locations. The control solar tiles may alter the configuration of the parking lot 300 according to rain such that available parking spaces may be moved to locations closer to cover and/or a building and the advertisement campaign 302 in an area furthest away from cover and/or the building.

In some implementations, the control solar tile can change different operational aspects within an operational state. For example, the control solar tile 102 can change and/or alternate images that are displayed on controlled solar tiles while the controlled solar tiles are within a display operational state. A displayed image can be changed or relocated according to status information received at the control solar tile 102. As previously described, an advertisement can be re-located according to the present weather conditions (i.e., shade, rain, etc.). The controlled solar tiles 104*f-g* can send status information and the status information can include data that communicates to the control solar tile 102 the present weather conditions.

In some implementations, a displayed image can be changed and/or relocated according to the time of day. For example, during the day time the parking lot 300 can include more parking space and less space for advertising campaigns 302. During the night, the parking lot may include more space for advertising campaigns 302 and less parking spaces because the demand for parking spaces is less at night than it is in the day time.

A displayed image can also be changed and/or relocated according to the location of the solar tile network. The parking lot 300 can be located in an area where during the day time and the night time it is better (i.e., more profitable) to offer more parking spaces than to offer space for advertisement campaigns.

Figure 4:
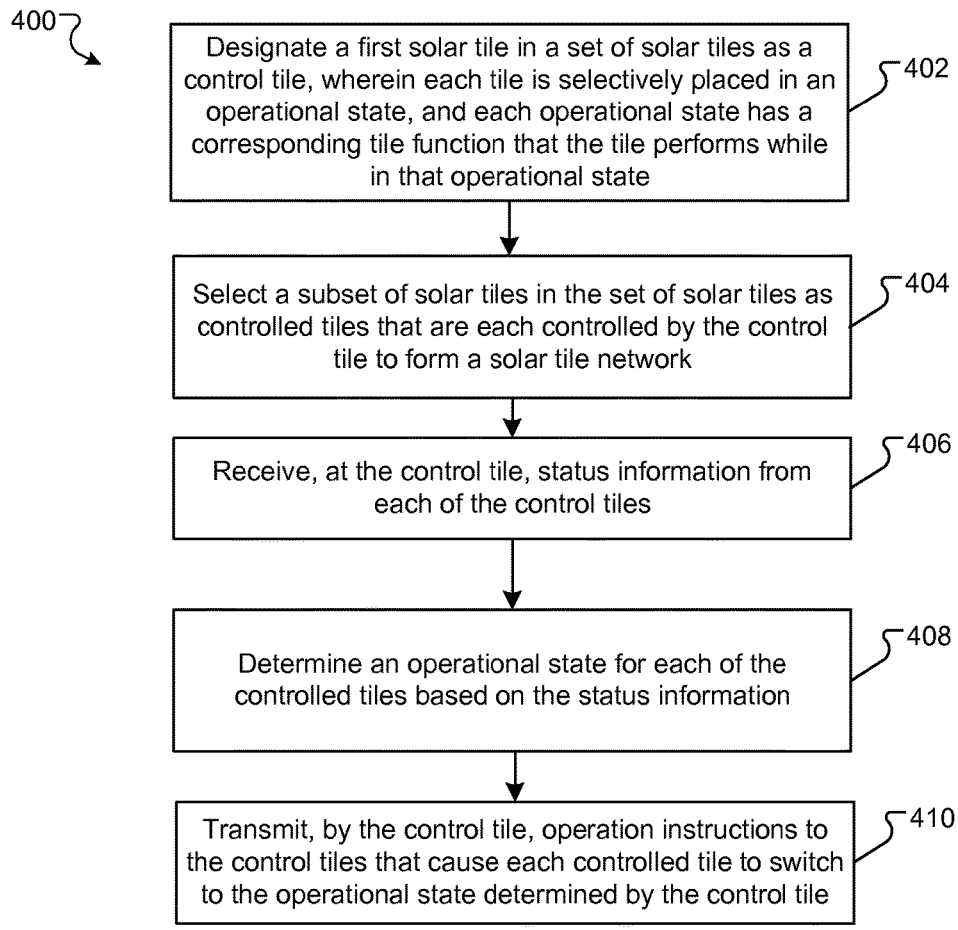
FIG. 4 is a flow diagram of an example solar tile network process for determining an operational state within a solar tile network.

FIG. 4 is a flow diagram of an example solar tile network process 400 for determining an operational state within a solar tile network 100. The process is implemented within the solar tile network 100. The process 400 can occur within a solar tile network 100 that includes more than one solar tile sub-networks 100 of at least two solar tile 105 operatively coupled to collectively execute instructions.

The solar tile network 100 designates a first solar tile in a set of solar tiles as a control solar tile 102, wherein each solar tile is selectively placed in an operational state, and each operational state has a corresponding tile function that the solar tile performs while in that operational state (402). As previously described, a control solar tile 102 can be designated according to various factors including randomly, according to a predetermined factor, by user choice or design, etc.

The process 400 can select a subset of solar tiles in the set of solar tiles as controlled solar tiles that are each controlled by the control solar tile to form a solar tile network (404). In some implementations, the solar tile network 100 may designate default operational states upon initialization of the solar tile network 100. Accordingly, as the controlled solar tiles 104*a-e* send status updates to the control solar tile 102, the control solar tile 102 can send operation instructions to the controlled solar tiles upon acknowledgement of various environmental states of the controlled solar tiles.

The control solar tile 102 receives status information from each of the control tiles 104*a-e* (406). In some implementations, the control solar tile 102 determines, based on status information updates in an environmental state threshold and/or an environmental state time threshold has been met, thereby determining that an environmental state has been met. Upon acknowledgement that an environmental state has been met, the control solar tiles determines an operational state for each of the controlled solar tiles 103*a-e* based on the status information (408). The control solar tile 102 determines which operational states correspond to the acknowledged environmental states.

Upon determination of the operational state, the control solar tile transmits operation instructions to the controlled solar tiles 104*a-e* that cause each solar tile to switch to the operational state determined by the control solar tile 102 (410). Subsequently, the controlled solar tiles 104*a-e* switch operational states according to the operational instruction received from the control solar tile.

While the examples above are described in the context of a parking lot, the solar tiles can be used in a larger network, such as a roadway. Furthermore, the tiles can also form networks to route messages to automobiles, dynamically display hazard notices, or adaptively develop detours and traffic directions to control traffic.

Figure 5:
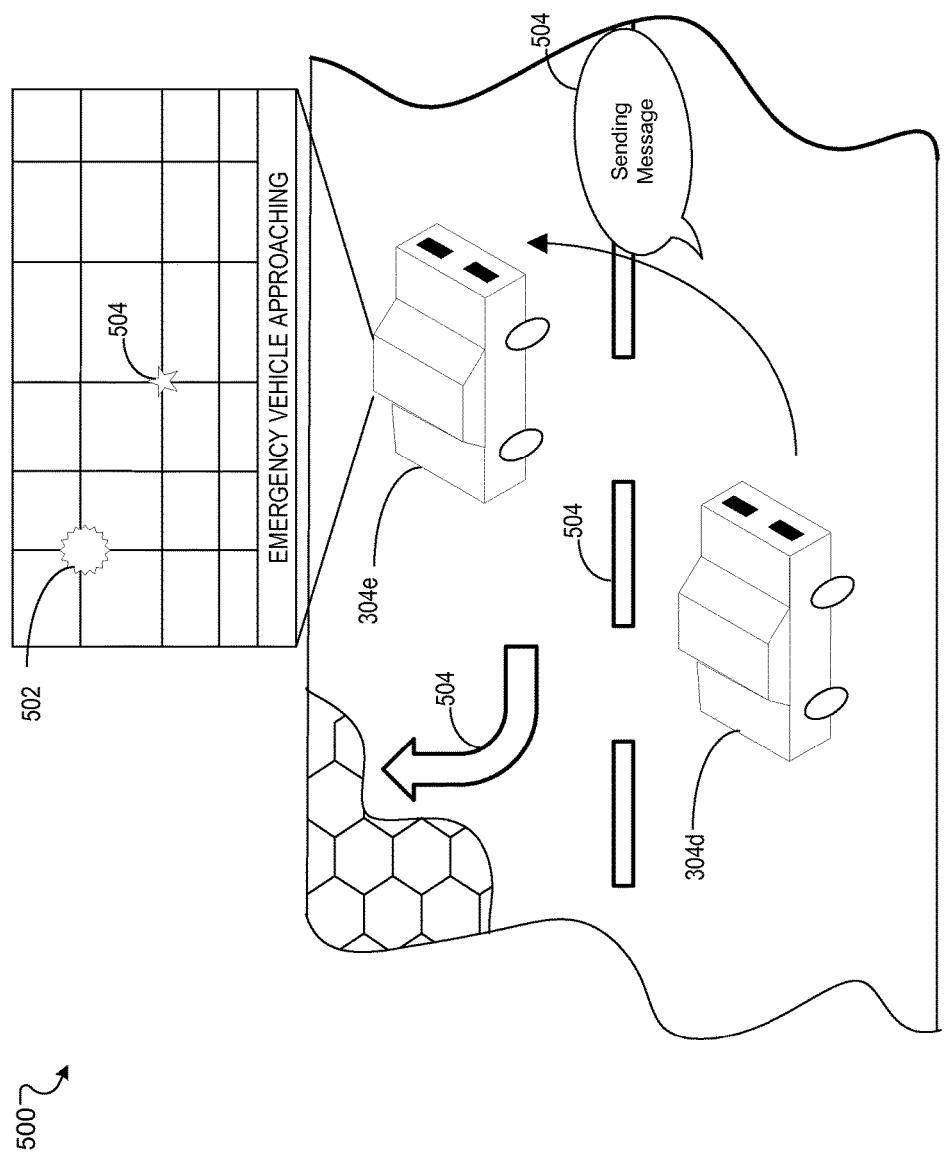
FIG. 5 is a block diagram illustrating an example solar tile network in operation and configured as a road way.

FIG. 5 is a block diagram illustrating an example solar tile network in operation, configured as a solar road way 500. The solar road way can include a solar tile network. Similar to other solar tile networks described in the instant specification, the solar road way 500 includes a control solar tile 102 and a set of controlled solar tiles. The controlled solar tiles can occupy various occupational states. In some implementations, a solar road way 300 can include environmental state thresholds and/or environmental state time thresholds for environmental states that are different than other solar tile networks.

As previously described, the solar tiles within the solar road way 500 can operate in the similar operational states as described in connection with FIG. 3. Moreover, the control solar tile 102 can change the operational state of the control tiles within the solar road way as changes in activity, environment, and time occur. Similarly, the control tiles 104*a-e* within the solar road way transmit status updates to the control solar tile relaying information regarding each control solar tile's current environmental state.

As shown in FIG. 5, two vehicles 304*d-e* are traveling down the solar road way 500. In some implementations, the vehicles can be electric vehicles. In some implementations, the controlled solar tiles in the middle of the solar road way can occupy a charging operation as the vehicles 304*d-e* drive down the road. Magnetic lines of flux are emitted from the control solar tiles in the middle of the road. As the vehicles drive down the road an inductive coil underneath the car can receive the magnetic lines of flux, thereby charging the battery and/or retarding the discharge of the battery of the vehicle.

In some implementations, the control solar tile 102 can detect and monitor the direction the car travels according to status information received by the controlled solar tiles 104*a-e*. The sensor array 218 within the controlled solar tiles 104*a-e* collect inductive coupling information received as the car passes over the controlled solar tiles 104*a-e*. Further, the control solar tile 102 can also determine the velocity of the vehicle 304*d-e*. Accordingly, the control solar tile 102 can switch the operational state of the controlled solar tiles 104*a-e* located within the solar road way 500 underneath the vehicle's path of travel such that the controlled solar tiles are switched to the charging state just prior to the arrival of the vehicle 304*d-e*. After the vehicle has passed, the control solar tile changes the operational state of the controlled solar tile back to the operational state the controlled solar tile was in prior to the vehicle passing.

Dynamically altering the operational state of the controlled solar tiles 104*a-e* in the vehicle's path of travel helps to minimize the amount of energy used within the solar tile network. Further, the solar road way 500 may disable this feature during certain times where traffic is heavy (e.g., rush hour in the mornings and evenings) and the control solar tile 102 will keep the solar tiles underneath the vehicles path in the charging operational state. In either scenario, the vehicle 304*d-e* can constantly have controlled solar tiles in the charging operational state underneath it.

In some implementations, some controlled solar tiles 104*a-e* occupy a display operational state. According to the position of the controlled solar tile relative to the controlled solar tile's position in the road, proximity to external objects (i.e., stop signs, traffic lights, curbs, fire hydrants, etc.), and so on, the controlled solar tiles can display various images. For example, controlled solar tiles in the vicinity of the middle of the road can resemble dashed lines 506 or solid lines (not shown) similar to lines in a traditional roadway.

In other implementations, the controlled solar tiles 104a-e can resemble traffic symbols, written instructions (i.e., detour signs, "stop", speed limit, traffic instructions, etc.). For example, the controlled solar tiles may resemble a left turn only sign 508.

In some implementations, vehicles 304d-e can include electronic communication mechanisms with various communication protocols such as blue tooth, GPS, cellular networks, 802.11, etc. In addition, the vehicles can each include an independent electronic identification mechanism such as a unique identifier (e.g., media access control (MAC) address, IP address, etc.). As previously described, each solar tile 105 has a communication mechanism 204 and the communication mechanism can communicate low bandwidth messages between the vehicles 304d-e.

In some implementations, the solar tiles can target communications with a particular vehicle using the vehicle's unique identifier and using like communications protocols. This enables vehicles to communicate with each other through the solar tile network. Additionally, vehicles can communicate text messages (e.g., SMS, MMS, etc.) between vehicles and devices within the vehicles. A user that has a bad reception from local cellular towers can use the solar roadway to transmit messages between other vehicles and other user devices.

Additionally, via the solar tile network, vehicles can communicate traffic information, local law enforcement information, road closure information, etc. The vehicles 304d-e can relay information relating to traffic delays, accident locations, stalled cars, check points, traffic stops, and so on between vehicles. In addition, some information can be displayed on a car's heads up display or a car's GPS unit.

Further, the solar tile network can assist vehicles by offering dynamic real time routing for driving directions according to traffic flows and information passed through the solar roadway 500. For example, if a vehicle 304d-e is using receiving driving directions to a destination and an accident suddenly occurs on the designated route or traffic begins to congest on the designated route, the directions given to the vehicle can be altered according to the sudden occurrence of the accident or traffic congestion. Further, the designated route can continuously be altered according to traffic disturbances until the vehicle 304d-e reaches its destination.

As previously described, vehicles 304d-e utilizing the communication mechanism within controlled solar tiles 104a-e in the solar roadway 500 can transmit information regarding local law enforcement between different vehicles 304d-e. Many vehicles have integrated GPS units 501 within the vehicle. Accordingly, a GPS unit 501 dictates the current position of the vehicle. As shown in FIG. 5, the first vehicle 304e includes a GPS unit 501 that displays the first vehicle's current location 504.

In the example illustrated in FIG. 5, an emergency vehicle (e.g., ambulance, fire truck, police car, etc.) is approaching the two vehicles 304d-e. The second vehicle 304d already has knowledge of the emergency vehicle and the location of the emergency vehicle. Accordingly, the second vehicle 304d sends a message 510 to the first vehicle 304e. The message 510 is transmitted from the second vehicle 304d to the first vehicle 304e through the communication mechanism 204 within the solar tiles of the solar roadway 500.

In some implementations, the message 510 can include a written message (e.g., emergency vehicle approaching, etc.). The message can include GPS data representing the present coordinates of the emergency vehicle 502. Accordingly, the GPS unit 501 can display the written message and the GPS location of the emergency vehicle 502. This will notify the driver of the first vehicle 304e that an emergency vehicle is approaching and the direction the emergency vehicle is approaching.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
designating a first solar tile in a set of solar tiles as a control tile, wherein each tile in the set of solar tiles is a photovoltaic panel and is operative to be selectively placed in one of a plurality of operational states, wherein each operational state has a corresponding tile function that the solar tile performs while in that operational state, the designating causing the control tile to be placed in a control operational state in which the control tile sends operational instructions to controlled tiles that cause each controlled tile to switch to one of the plurality of operational states specified by the operational instructions;
selecting a subset of solar tiles in the set of solar tiles as the controlled tiles that are each controlled by the control tile to form a solar tile network that includes the control tile and the controlled tiles;
receiving, at the control tile, status information from each of the controlled tiles;
determining, by the control tile, an operational state for each of the controlled tiles based on the status information, including determining a first operational state for a first controlled tile and a second operational state for a second controlled tile, and the first operational state is different from the second operational state; and transmitting, by the control tile, operation instructions to the controlled tiles that cause each controlled tile to switch to the operational state determined by the control tile, including transmitting first operational instructions to the first controlled tile to cause the first controlled tile to switch to the first operational state, and second operational instructions to the second controlled tile to cause the second controlled tile to switch to the second operational state;

receiving, at the control tile, updated status information for the each of the controlled tiles;

determining, by the control tile, that an environmental condition for the control tile and the first controlled tile has changed based on the updated status information and information collected by the control tile about environmental surroundings of the control tile;

transmitting, by the control tile, operation instructions to the first control tile designating the first control tile to change the operational state for the first controlled tile from the first operational state to the control operational state, the designating changing the first controlled tile to a new control tile different than the control tile; and changing, by the control tile, the operational state of the control tile from the control operational state to a first operational state, such that the control tile is changed to a third controlled tile.

2. The method of claim 1, wherein the operational states comprise a charging operational state, a display operational state, and a power generation operational state; wherein a display operational state includes transmitting image data to the controlled solar tiles that defines an illuminated pattern to be displayed on a surface of the controlled solar tiles such that an image is created on the surface of the controlled solar tiles.

3. The method of claim 1, wherein the operation instructions comprise an instruction for a display operational state; wherein the display operational state includes transmitting image data to the controlled solar tiles that defines an illuminated pattern to be displayed on a surface of the controlled solar tiles such that an image is created on the surface of the controlled solar tiles.

4. The method of claim 3, wherein transmitting operation instructions for the display operational state includes transmitting image data to the controlled tiles that defines an illuminated pattern to be displayed on a surface of the controlled solar tiles such that an image is created on the surface of the controlled solar tiles.

5. The method of claim 1, wherein based on the status information received at the control tile, transmitting the operation instructions to the controlled tiles such that the operation instructions change different operational features within the respective operational state.

6. The method of claim 5, wherein changing different operational features within the operational state comprises altering display images of the controlled tiles within a particular location of the network, based at least in part on one of the following: status information received at the control solar tile, time of day, and relative maximization of solar tile charging capacity.

7. The method of claim 5, wherein changing different operational features within the respective operational state comprises altering display images of the controlled tiles within a particular location of the network based on a predefined timed interval.

8. The method of claim 1, further comprising:
transmitting, by the control tile, operation instructions to the controlled tiles that cause each controlled tile to switch to the operational state determined by the control tile; and
in response to the operation instructions, changing a location of at least one display image, the location chosen based in part on at least one of the following: status information received at the control solar tile, time of day, and maximization of solar tile network operations.

9. The method of claim 1, further comprising:
receiving, at the control tile, status information from each of the controlled tiles; and
based on the status information received from each of the controlled tiles, determining an environmental state for the controlled tile, wherein the environmental state is defined by an environmental condition of an environment for which the respective solar tile is deployed.

10. The method of claim 9, wherein determining an operational state for each of the controlled tiles is based on selecting an operational state that corresponds to the determined environmental state, the operational state dictating an executable function for the controlled tile.

11. The method of claim 9, wherein determining the environmental state of the controlled tile comprises determining whether an environmental state threshold has been met, wherein the environmental state threshold defines a measure that an environmental condition exists in an environment for which the controlled tile is deployed.

12. The method of claim 9, wherein determining the environmental state of the controlled tile comprises determining an environmental state time threshold has been met wherein the environmental state time threshold defines a length of time that the environmental condition exists in an environment for which the controlled tile is deployed.

13. The method of claim 1, wherein the solar tile network comprises at least one of the following: a mesh network, an ad hoc network, a wide area network, a star network, and a fully connected network.

14. The method of claim 1, wherein receiving, at the control tile, status information from each of the controlled tiles comprises receiving status information according to a predefined time interval.

* * * * *